United States Patent [19]
Chihak et al.

[11] 4,106,018
[45] Aug. 8, 1978

[54] METHOD AND APPARATUS FOR REDUCING INTERFERENCE BETWEEN PLURAL RADIO ALTIMETERS

[75] Inventors: Paul P. Chihak, Atkins; Charles H. Wehage, Cedar Rapids, both of Iowa

[73] Assignee: Rockwell International Corporation, El Segundo, Calif.

[21] Appl. No.: 788,374

[22] Filed: Apr. 18, 1977

[51] Int. Cl.² .............................................. G01S 9/24
[52] U.S. Cl. .................................. 343/12 A; 343/7.5; 343/14
[58] Field of Search .................... 343/7.5, 12 A, 14, 6; 325/52

[56] References Cited
U.S. PATENT DOCUMENTS

| | | | |
|---|---|---|---|
| 3,050,726 | 8/1962 | Laurent | 343/7.5 |
| 3,218,641 | 11/1965 | Maynard | 343/14 |
| 3,336,593 | 8/1967 | Stover | 343/12 A |
| 4,010,468 | 3/1977 | Fishbein et al. | 343/7.5 |

Primary Examiner—Maynard R. Wilbur
Assistant Examiner—Lawrence Goodwin
Attorney, Agent, or Firm—Richard A. Bachand; H. Frederick Hamann

[57] ABSTRACT

A method and apparatus for independently controlling a CWFM radio altimeter to reduce interference from another nearby altimeter employs a high-Q filter outside the bandpass of the signals which are developed and decoded for altitude indication to detect an approaching interference signal received from the other altimeter and produce an output to a threshold detector. When the output of the filter exceeds a predetermined level, the threshold detector causes the transmitted frequency of the altimeter to be stepped.

In one embodiment, a digital counter is provided to cyclically count up and down at a desired sawtooth modulation frequency. The output of the counter is applied to a digital-to-analog converter to produce an output used to control the frequency of the transmitted signal. Additionally, the output of the counter is conducted to inputs of an adder having a preset add number therein. When the output from the threshold detector is produced, it loads the counter immediately with the sum of the present counter output with the preset add number. The counter then begins its count at the totalled count, thereby immediately stepping the transmitter frequency. In redundant systems, each transmitter frequency can be shifted a different amount in an individual preset direction.

15 Claims, 7 Drawing Figures

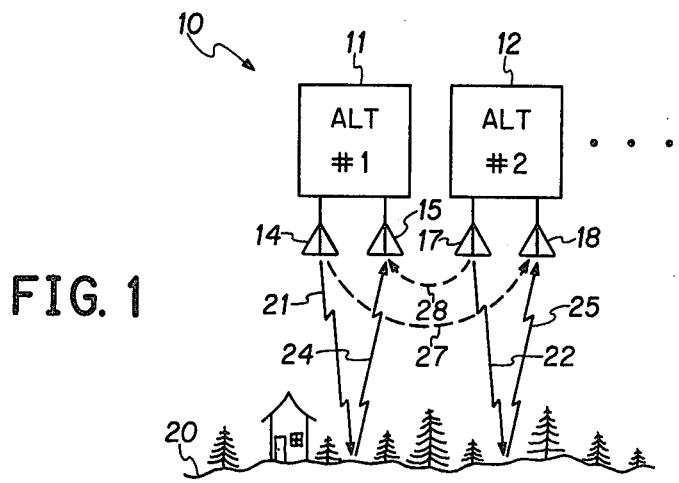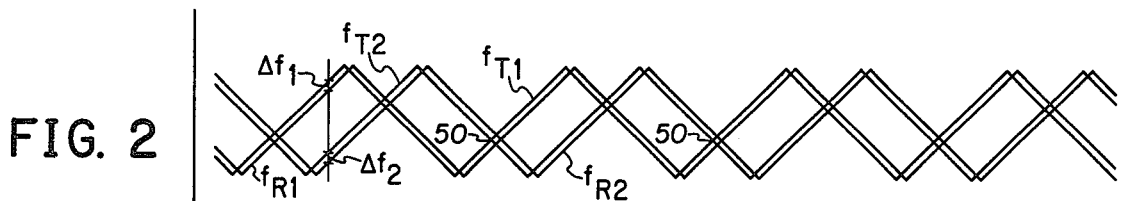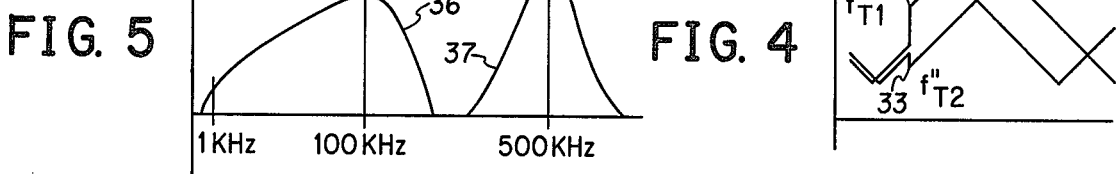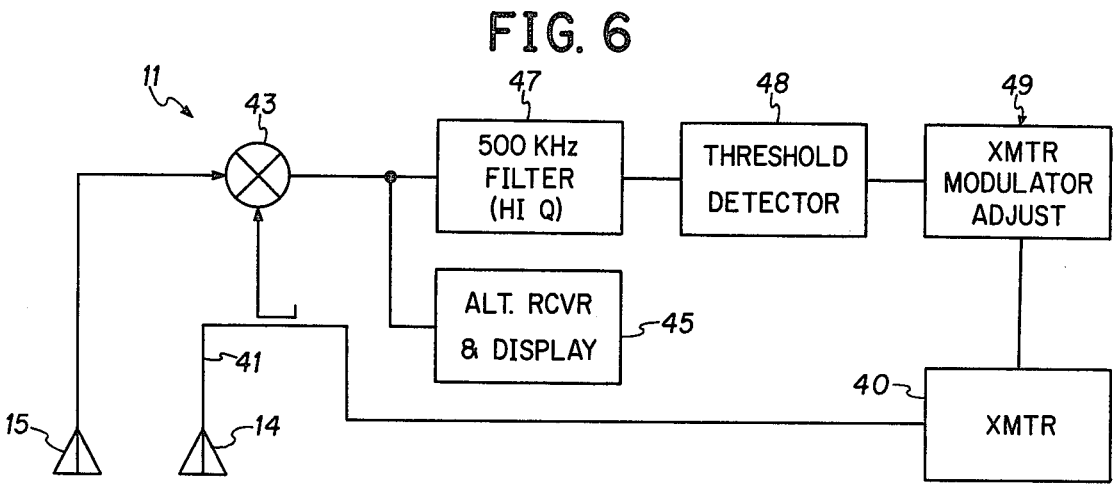

METHOD AND APPARATUS FOR REDUCING INTERFERENCE BETWEEN PLURAL RADIO ALTIMETERS

BACKGROUND OF THE INVENTION

1. Field of the Invention

This invention relates to improvements in plural radio altimeter systems, and, more particularly, to an improved method and apparatus for reducing interference between a plurality of radio altimeters.

2. Description of the Prior Art

Multiple navigation sensors are becoming of widespread use, especially in automatic flight control systems. Typically, flight control systems rely upon dual or triple sensors, the outputs of which in some cases are voted upon to produce the most likely accurate signal upon which the flight control system can rely for operation of the aircraft.

Continuous wave frequency modulated (CWFM) radio altimeters are also now of widespread use. Their operation is briefly as follows. A transmitter signal of approximately 4300 MHz is modulated with a modulation frequency which changes in accordance with a sawtooth function to sweep the transmitter signal over about 100 MHz at a rate of about 100 Hz. The transmitted signal is directed to the underlying terrain, from which reflections are received and mixed with a currently transmitted signal. The difference in the transmitted and received frequencies is relatable to the two-way travel time or propagation delay, and can be decoded to indicate altitude, all as is known in the art.

In plural or redundant systems, two or more such radio altimeters are used, often with their transmitter and receiver antennas physically located side-by-side. Although the placement of the antennae of plural altimeter systems plays a large part in avoiding mutual interference between them, the modulation phase differential of the redundant altimeters are usually carefully controlled, for if such control is not properly achieved, each receiver may detect the signals of the other transmitter and produce an erroneous reading. Such erroneous reading may furthermore be produced simultaneously by both altimeters, each interferring with the other and appearing correct, since the erroneous indication redundantly appears in the system. Typically, however, when one of the transmitter modulation frequencies of the radio altimeters moves into phase alignment with the other, it coincides entirely with the frequencies of the other transmitter. This results in both altimeters rapidly showing increased altitude indications as the frequencies move into coincidence, then a rapid return to the original altitude indication after the frequencies cross. This phenomenon is generally violently exhibited, and its display is undesirably disconcerting to flight crews.

To solve this problem, transmitter interconnections have been used to coordinate the modulation frequency sweeps and force a fixed phase offset of the respective altimeters' transmitters. However, if one of the radio altimeters should fail, such interconnections may cause the others in the system also to fail, or render the entire system unusable.

SUMMARY OF THE INVENTION

In light of the above, it is, therefore, an object of the invention to provide a method and apparatus for controlling the modulation phase difference of a plurality of CWFM radio altimeters to reduce interference therebetween.

It is another object of the invention to provide such interference control which can operate independently with respect to each CWFM radio altimeter with which it is associated.

It is still another object of the invention to provide an interference controlling apparatus for use with a CWFM radio altimeter which can be associated with a single altimeter to permit failure of the altimeter without disabling an entire redundant altimeter system.

It is another object of the invention to provide an apparatus for controlling the modulation phase of a radio altimeter which requires no direct interconnection to other altimeters of an associated or redundant altimeter system.

It is another object of the invention to provide a transmitter modulation phase control for a CWFM radio altimeter which employs digital circuitry.

These and other objects, features, and advantages will become apparent to those skilled in the art from the following detailed description when read in conjunction with the accompanying drawing and appended claims.

The invention, in its broad aspect, presents an apparatus for independently controlling the transmitter modulation phase of one of a plurality of CWFM radio altimeters. In one embodiment, each altimeter may include an associated similar apparatus, to further reduce the interference therebetween. Each apparatus includes means for detecting the approach of interference signals toward an acceptable bandpass of the altimeter with which it is associated. Means are provided for stepping the transmitter frequency and, therefore, the modulation phase of the radio altimeter when the approach is detected. In one embodiment, a 500 kHz filter is connected to receive the returned altimeter signal after it has been mixed with the transmitter signal to produce an output to a threshold detector. When a signal within the 500 kHz filter bandpass is detected, an up-down counter is incremented by a preset amount to immediately step the transmitter frequency and consequently its modulation phase to change the instantaneous frequency of operation thereof away from the interferring signals.

BRIEF DESCRIPTION OF THE DRAWING

The invention is illustrated in the accompanying drawing, wherein:

FIG. 1 is a box diagram showing a pair of radio altimeters of a plural altimeter system and their desired and interference signal travel paths.

FIG. 2 is a graph of frequency versus time of the transmitted and received frequencies of the transmitters of FIG. 1.

FIG. 3 is a graph of frequency versus time of the transmitter frequencies of the altimeters of FIG. 1, showing the convergence thereof and the modulation phase or frequency stepping thereof in accordance with one aspect of the invention.

FIG. 4 is a graph of frequency versus time of the transmitter frequencies of the altimeters of FIG. 1 showing the operation of an alternative embodiment of the invention in which both transmitter frequencies are stepped.

FIG. 5 is a graph of frequency versus amplitude, comparing the bandpass of the desired altitude indicating frequencies and the detecting bandpass of an approaching interference signal.

FIG. 6 is a box diagram of a radio altimeter employing the interference control in accordance with the invention.

In the various figures of the drawing, like reference numerals are used to denote like parts.

DETAILED DESCRIPTION OF THE PREFERRED EMBODIMENTS

Figure 7:
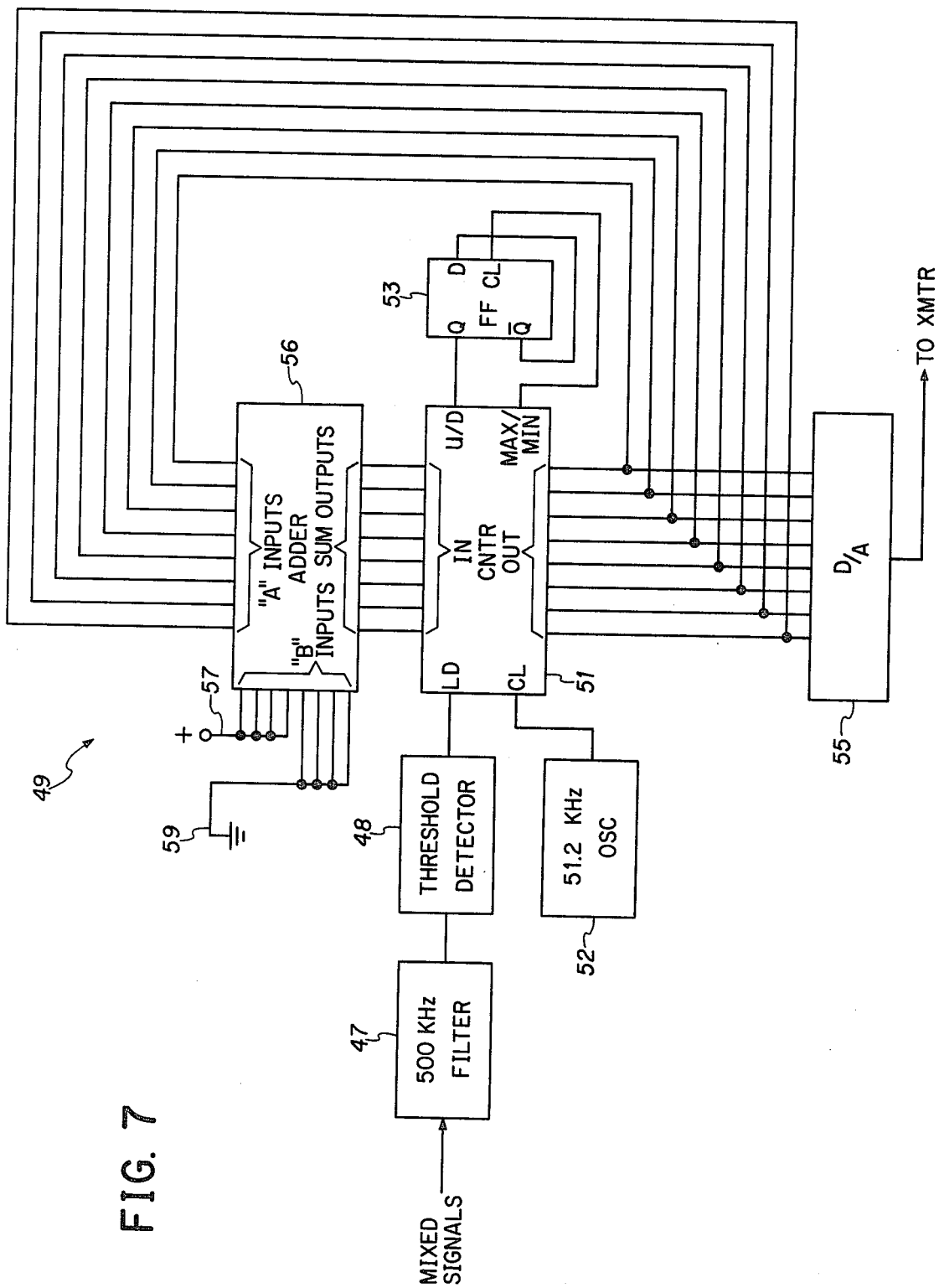
FIG. 7 is a box diagram showing in detail the frequency controlling apparatus of the invention.

As shown in FIG. 1, a redundant altimeter system 10 for use on an aircraft (not shown) includes a plurality of CWFM radio altimeters, two such altimeters 11 and 12 being shown for illustration. Typically, such redundant system uses two or three such CWFM radio altimeters, the outputs of which may be fed to computers whose outputs are voted, to produce an accurate altitude indication. The altimeter 11 includes a transmitter antenna 14 and a receiver antenna 15, and likewise, the altimeter 12 includes a transmitter antenna 17 and a receiver antenna 18. Each of the altimeters 11 and 12 directs radio signals to the underlying terrain 20, as shown by the respective arrows 21 and 22. Reflections of the radio signal 21 are then received upon the receiver antenna 15 of the altimeter 11, and reflections of the transmitted signal 22 are received upon the receiver antenna 18 of the altimeter 12, as shown by the lines 24 and 25, respectively. However, a portion of the transmitted signals from the altimeter 11 will be detected upon the antenna 18 of the altimeter 12, and, in like fashion, a portion of the transmitted signals of the altimeter 12 will be received upon the receiver antenna 15 of the altimeter 11, as denoted respectively by the dashed lines 27 and 28.

This cross detection is not necessarily undesirable, unless the frequencies received by the altimeters 11 and 12 are within the bandpass of the other. In such case, the violent display exhibition above referred to may occur.

Thus, with reference now to the graph of FIG. 2, it can be seen that the transmitter frequency of the transmitter 11, denoted by the line $f_{T1}$, is ideally displaced from the transmitter frequency of the other altimeter 12, denoted by the letter $f_{T2}$, for example, by an amount corresponding to a 90° phase displacement of the modulating frequency. The received frequencies, denoted by the letters $f_{R1}$ and $f_{R2}$, respectively, follow their respective transmitted frequencies, but are displaced slightly in time from them due to the two-way propagation delay directly proportional to the altitude of the aircraft. The differences in frequencies between the transmitted and received signals of the altimeters are denoted by $\Delta f_1$ and $\Delta f_2$, respectively, and are ideally the same. Since the transmitted and received signals are or, at least should be, displaced, each altimeter is ideally concerned only with instantaneous signals outside of the bandpass of the other.

However, if no means is provided to properly synchronize the phase offset of the modulating sources, the transmitter frequencies of the altimeters will converge, corresponding to zero difference in modulating frequencies. Thus, as shown in FIG. 3, the frequency $f'_{T2}$ may drift gradually into the region of the transmitter frequency of the first altimeter, denoted by $f'_{T1}$. If the transmitter frequency, and/or reflected wave frequency of the second altimeter comes within the bandpass, typically 100 kHz, of the first altimeter, an interference signal may be produced by both altimeters. Consequently, in accordance with the invention, when the transmitter frequencies begin to drift together to an extent that the reflected signals are cross detected, the frequency of at least one of the transmitters is stepped, as indicated by the step 30.

Alternatively, as shown in FIG. 4, the frequencies of each of the transmitters of the respective altimeters can be stepped, for example, in opposite directions. Thus, the frequency $f''_{T1}$ is stepped upwardly, denoted by the reference numeral 32, and the transmitter frequency $f''_{T2}$ is stepped downwardly, as indicated by the reference numeral 33. In either case, after the step has been made, the transmitter frequency phases will once again be separated to an extent beyond that at which the signals interfere.

The concept by which the approach of the transmitter frequencies is detected is illustrated in FIG. 5. The ordinary bandpass at which the altitude indicating signal of the altimeter operates is typically at 100 kHz, having a characteristic curve 36 with a gradual rolloff to 1 kHz and a rapid rolloff above 100 kHz. When two transmitter frequencies approach the other, the frequency difference detected by each altimeter will initially be large, converging to the 100 kHz level as the transmitter frequencies converge. Thus, before the transmitter frequencies can approach and cross, the difference signal detected by the altimeters will pass through a higher frequency region, such as 500 kHz, as shown by the curve 37. Thus, as will become apparent below, the difference signal is monitored at a frequency higher than that of the ordinary altitude signal bandpass, i.e., at 500 kHz, at which point the transmitter frequency is stepped.

More specifically, a typical CWFM altimeter 11 is illustrated in FIG. 6. (It should be noted that in a preferred embodiment, each of the altimeters used would be fabricated in accordance with principles of the invention, although, in some applications, only a single altimeter or a redundant system need be so constructed.) As shown in FIG. 6, a transmitter 40 produces a signal, for example, at 4300 MHz, modulated by a sawtooth shaped signal, causing the transmitter frequency to swing about 100 MHz, at a repetition rate of about 100 Hz. The transmitter frequency is delivered on a transmission line 41 to the transmitting antenna 14 located at an appropriate location of an aircraft (not shown). Reflections from the underlying terrain are detected on the receiver antenna 15 and delivered to a mixer 43. A portion of the transmitter frequency is coupled by a coupler 44 to be mixed within the mixer 43 with the received signals, to produce a mixed signal having a frequency $\Delta f_1$ (see FIG. 2) indicative of the altitude at which the aircraft is flying. The mixed frequency is then decoded by a usual altimeter receiver and display 45.

Additionally, in accordance with the invention, a 500 kHz filter 47 having a relatively high Q receives the mixed signal from the mixer 43. The filter can conveniently be a single pole L-C circuit, and can have a Q of about 25. The output from the 400 kHz filter 47 is applied to a threshold detector 48, which produces an output to a transmitter modulator adjusting circuit 49 when the threshold level from the output of the 500 KHz filter is exceeded.

It should be noted at this point that the high Q requirement of the filter 47 provides a delay in its output reaching the required threshold to activate the threshold detector 48. Thus, occasional right angle crosses of the transmitter frequencies $f_{T1}$ and $f_{T2}$ which normally occur (denoted by reference numeral 50 in FIG. 2) will transpire at such a rapid rate that insufficient energy can build up in the filter 47 to produce an output sufficient to trigger the threshold detector 48. On the other hand, when the transmitter frequencies gradually approach, in the fashion shown in FIG. 3, the filter 47 "rings up" sufficient energy to trip the threshold detector 48, thereby activating the transmitter modulator adjusting circuit 49 to step the transmitter frequency to a non-interferring frequency phase.

A transmitter modulator adjusting circuit 49 is shown in detail in FIG. 7, and includes an up-down counter 51, which normally operates to count clock pulses from a 51.2 kHz oscillator 52, and which has a "load" input terminal connected to receive the output of the threshold detector 48. The counter 51 is controlled to operate cyclically to count up and down by a flip-flop 53, connected as shown to present complementary outputs upon an output terminal Q each time it is clocked by an overflow or underflow condition of the counter 51. The frequency of the oscillator 52 is chosen to produce an up and down cycle of the counter 51 in a time corresponding to the desired sawtooth modulation frequency. Thus, for instance, an eight place counter with an oscillator (clock) frequency of 51.2 kHz will produce a sawtooth modulation frequency of 100 Hz. Other frequencies can be chosen for other particular circuit embodiments as needed.

The counter 51 is of the type which operates to immediately register the count appearing at the input terminals onto its output terminals when a signal is applied to its "load" input. One commercially available counter which can be used in the construction of the transmitter modulator adjusting circuit 51 can conveniently be, for instance, of the type LS191, manufactured by National Semiconductor Corporation, although any counter having similar operating characteristics may be equally advantageously employed.

The outputs from the counter 51 are connected to a digital-to-analog (D/A) converter 55, the output of which provides the driving modulator signal to the transmitter.

Additionally, the outputs from the counter 51 are connected to one set of inputs of an adder 56. Another set of inputs to the adder 56 are connected to various preset states, the first four, for example, to a high state 57 and the second four to a low state 59, as shown. The particular configuration of the second set of adder inputs can be any desired, and will determine the direction and degree to which the transmitter frequency is shifted. Thus, it is anticipated that in a typical redundant altimeter system, the second inputs to the adder 56 will be connected to different preselected states to enable each altimeter to react differently to the approach of another transmitter frequency. Otherwise, if two modulation controls were preset to "jump" a corresponding distance and direction, they may "jump" to another interfering state, which would not alleviate the interference problem. For example, in a redundant altimeter system employing triple ratio altimeters, the first altimeter can be stepped 90 degrees (which may correspond to a frequency step, for instance of 50 MHz), the second altimeter 45° (25 MHz), and the third altimeter 22 ½ degrees (12.5 MHz). Thus, regardless of which pair may interfere, the steps produced in the respective transmitters will move the frequencies to non-interfering frequency regions.

The effect of stepping each pair of interfering altimeters is illustrated in FIG. 4, where, for instance $f''_{T1}$ is stepped up 45° and $f''_{T2}$ is stepped down 22½ degrees.

The outputs from the adder 56 are connected to the inputs of the counter 51, which, as above mentioned, are immediately loaded to the counter outputs, upon the presence of a load signal at the output of the threshold detector 48.

It should be noted that the use of the adder 56 in conjunction with the modulation adjusting circuit 49 enables frequency stepping of a minimum predetermined magnitude. An alternative embodiment, not shown, may load directly into the counter 51 a constant number to merely initialize the count to that constant if an interference signal approached.

Although the invention has been described and illustrated with a certain degree of particularity, it is understood that the present disclosure has been made by way of example only, and that numerous changes in the arrangement and combination of parts may be restored to by those skilled in the art without departing from the spirit and scope of the invention as hereinafter claimed.

We claim:

1. Apparatus for independently controlling the phase of the modulating frequency of a transmitter of at least one of at least two simultaneously operating CWFM ratio altimeters to reduce interference between said at least two altimeters, comprising:
    a filter connected to continuously receive a signal generated by said at least one altimeter, said signal having a frequency equal to the difference between a signal transmitted by said at least one altimeter and a signal recieved by said at least one altimeter to indicate altitude;
    said filter having a bandpass centered about a frequency above and essentially outside of the bandpass of frequencies of said altitude indicating signal to pass frequencies approaching the bandpass of said altitude indicating signal;
    a threshold detector receiving an output of said filter, and
    means responsive to an output of said threshold detector to step said at least one altimeter transmitter frequency.

2. The apparatus of claim 1 wherein said filter is a high-Q filter.

3. The apparatus of claim 1 wherein the bandpass of said filter is centered about 500 kHz.

4. The apparatus of claim 1 wherein said means responsive to an output of said threshold detector to step the transmitter frequency comprises:
    a counter connected to cyclically count up and down, means responsive to the up and down count of said counter, to produce a sawtooth modulation waveform of said transmitter frequency in response to said count, and
    means to change the count of said counter by a preset amount in response to the output of said threshold detector.

5. A plurality of apparatuses for independently controlling the phases of the modulating frequencies of the transmitters of a plurality of respectively associated simultaneously operating CWFM radio altimeters to reduce interference therebetween, each of said altimeters comprising:
    means for detecting outside an acceptable signal bandpass the approach in frequency of interference signals toward the acceptable signal bandpass, and means for stepping the transmitter frequency when said approach in frequency is detected.

6. The apparatuses of claim 5 wherein each of said stepping means is preset to step its associated altimeter transmitter frequency with a unique direction and magnitude.

7. The apparatuses of claim 5 wherein each of said detecting means comprises a high-Q filter to which a received signal is applied, and
 a threshold detector receiving an output from said filter to produce a signal to said stepping means.

8. The apparatuses of claim 7 each of which further comprising a counter to which said threshold detector output is applied operating to load a preset number into said counter.
 said counter operating cyclically up and down to produce an up and down count, and
 a digital-to-analog converter to which said up and down count is applied to produce a sawtooth output in accordance with which said transmitter is modulated.

9. The apparatuses of claim 8 each of which further comprising an adder to which the output of said counter is applied,
 signal producing means connected to selected inputs of said adder to define said present number to be added to the output of said counter when said threshold detector produces an output.

10. The apparatuses of claim 9 each of which further comprising an oscillator connected to clock said counter at a frequency of about 51.2 kHz.

11. The apparatuses of claim 7 wherein said high-Q filter has a bandpass centered about 500 kHz.

12. The apparatuses of claim 5 wherein the CWFM ratio altimeters are three in number.

13. The apparatuses of claim 12 wherein said stepping means are preset to step each transmitter 90°, 45°, and 22½°, respectively.

14. A method of reducing the interference between redundant simultaneously operating CWFM ratio altimeters of the type which transmit a signal and receive a reflection of the transmitted signal, comprising:
 detecting a frequency approaching interference signal transmitted by one of said altimeters and received by at least another of said altimeters outside of the bandpass of desired altitude indicating signals of said another of said altimeters, and
 stepping a transmitter frequency of said at least another of said altimeters in response to detecting a frequency approaching interference signal.

15. The method of claim 14 wherein said detecting step comprises:
 applying a mixed altimeter signal to a high-Q 500 kHz filter, and
 detecting a threshold level of an output of said filter.

* * * * *